UNITED STATES PATENT OFFICE.

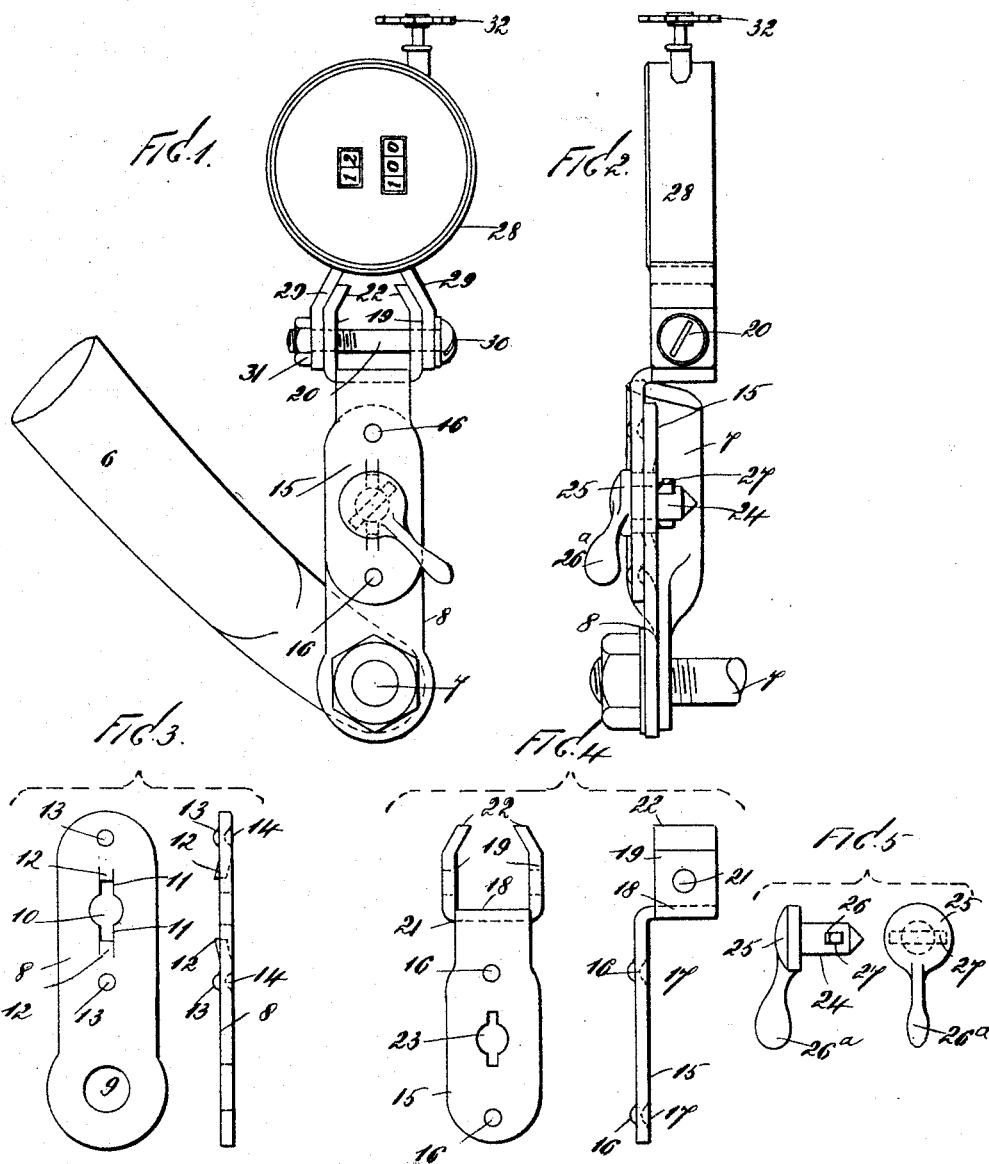

FREDERICK MACKINTOSH, OF SCHENECTADY, NEW YORK.

CYCLOMETER ATTACHMENT FOR BICYCLES.

SPECIFICATION forming part of Letters Patent No. 587,010, dated July 27, 1897.

Application filed April 3, 1897. Serial No. 630,543. (No model.)

*To all whom it may concern:*

Be it known that I, FREDERICK MACKINTOSH, a citizen of the United States, residing at Schenectady, in the county of Schenectady and State of New York, have invented certain new and useful Improvements in Cyclometer Attachments for Bicycles, of which the following is a full and complete specification, such as will enable those skilled in the art to which it appertains to make and use the same.

This invention relates to devices for connecting a cyclometer with a bicycle or similar vehicle; and the object thereof is to provide an improved device of this class which is simple in construction and operation and by means of which any form of cyclometer may be quickly and easily connected with a bicycle or similar vehicle and as quickly and easily detached therefrom.

The invention is fully disclosed in the following specification, of which the accompanying drawings form a part, in which—

Figure 1 is a side view of a portion of the lower front fork of the frame of a bicycle or similar vehicle and showing my improvement connected therewith; Fig. 2, a front view thereof; Fig. 3, a side and edge view of one part of the attachment which I employ; Fig. 4, a side and end view of another part thereof, and Fig. 5 a front and side view of a detail of the construction.

In the drawings forming part of this specification the separate parts of my improvement are designated by the same numerals of reference in each of the views, and in Figs. 1 and 2 I have shown at 6 one side of the front fork of a bicycle or similar vehicle and at 7 a part of the shaft on which the guide-wheel is mounted, said shaft being passed through the lower end of the fork in the usual manner; and in the practice of my invention I provide a device for the purpose herein specified which comprises an oblong plate 8, which is provided at its lower end with a hole 9, through which the shaft 8 passes, and near its upper end with a circular opening 10, which is provided at its upper and lower sides with longitudinal slots 11, which communicate therewith and at the outer ends of which are formed tongues 12, which are cut from the material of the plate 8 and curved outwardly, as clearly shown in Fig. 3.

Formed above and below the opening 10 on one side of the plate 8 are outwardly-directed knobs or projections 13, and the opposite side of said plate is provided with corresponding cavities or recesses 14, and I also provide a supplemental oblong plate 15, which is shown in detail in Fig. 4 and which is provided on one side with knobs or projections 16, which are adapted to enter the notches or recesses 14 in the plate 8, and the plate 15 is also provided on the side opposite the knobs or projections 16 with corresponding cavities or depressions 17.

The knobs or projections 13 on the plate 8 and the knobs or projections 16 on the plate 15 are formed by stamping, and this operation forms the cavities or recesses 14 and 17 in said plates 8 and 15 but the cavities or depressions 14 in the plate 8 and the knobs or projections 16 on the plate 15 have no function and are not essential to this invention.

The upper end of the plate 15 is provided with an angular extension 18, which is provided at its sides with upwardly-directed jaws 19, through which is passed a bolt 20, said jaws being provided with holes or openings 21 for this purpose, and the upper ends of the jaws 19 are curved inwardly, as shown at 22, and the plate 15 is provided centrally with an opening 23, which corresponds with the opening 10 in the plate 8, and at the opposite sides of which are formed slots 23ª, which are adapted to receive the tongues 12 on the plate 8, and I also provide a key-bolt 24, which is provided at one end with a head 25, on which is formed a handle 26ª, this construction being shown in detail in Fig. 5, and the end of the bolt 24 is provided with a transverse opening 26, through which is passed a key-wedge 27.

In practice I also form on or connect with a cyclometer 28, of any preferred form or construction, side arms or jaws 29, which are adapted to inclose the jaws 19 of the plate 15, and the bolt 20 also passes through the side arms or jaws 29, and said bolt is provided at one end with a head 30 and at the opposite end with a nut or bur 31, and by means of this construction the cyclometer may be secured to the jaws 19 of the plate 15 whenever desired and also quickly and easily detached therefrom.

In securing the cyclometer to the bicycle or other vehicle the plate 8 is connected with the shaft or axle 7, as shown in the drawings, and the plate 15 is secured to the plate 8 by placing said plates together side by side, as shown in Figs. 1 and 2, and passing the locking-bolt 24 therethrough, and the key-wedge 27 is then driven through the opening 26 in said bolt, and the inner side of said key-wedge is beveled and enters the slots or grooves 11 at the side of the opening 10 in the plate 8, and the handle 26 of the key-bolt is then turned so that the key-wedge 27 will operate to clamp the plates 8 and 15 securely together, and in this operation the knobs or projections 13 on the plate 8 enter the cavities or recesses 17 in the plate 15 and securely hold said plates and prevent one from turning upon the other.

The cyclometer 28 is provided with the usual star or sprocket wheel 32, which is adapted to be operated by the guide-wheel of the vehicle in the usual manner, and it will thus be seen that I accomplish the object of my invention by means of a device which is simple in construction and operation and which is well adapted to accomplish the result for which it is intended.

It will also be seen that by means of my improvement the cyclometer may be quickly and easily detached from the vehicle whenever desired and as quickly and easily connected therewith, and in order to detach the cyclometer it is only necessary to turn the handle 26 of the bolt 24 and remove the wedge 27, and the reverse of this operation will connect the cyclometer with the vehicle.

The plate 8 may be secured to the vehicle in any desired manner, and

Having fully described my invention, I claim as new and desire to secure by Letters Patent—

1. A device for connecting cyclometers with bicycles and other vehicles, consisting of a main oblong plate 8, which is provided adjacent to one end thereof, with an opening at the opposite sides of which are formed slots, and tongues which project outwardly on one side of the plate, and a supplemental plate 15, which is also provided with an opening which corresponds with that in the main plate, and at the sides of which are formed slots, a key-bolt which is adapted to pass through said openings, and which is provided with a key-wedge, and at one end thereof with a handle, said supplemental plate being provided at its upper end with jaws through which a bolt is passed, substantially as shown and described.

2. A device for connecting cyclometers with bicycles and other vehicles, consisting of a main oblong plate 8, which is provided adjacent to one end thereof, with an opening, at the opposite sides of which are formed slots, and tongues which project outwardly on one side of the plate, and a supplemental plate 15, which is also provided with an opening which corresponds with that in the main plate, and at the sides of which are formed slots, a key-bolt which is adapted to pass through said openings, and which is provided with a key-wedge, and at one end thereof with a handle, said supplemental plate being provided at its upper end with jaws through which a bolt is passed, and said main and said supplemental plates being provided one with cavities or recesses, and the other with knobs or projections which correspond therewith, substantially as shown and described.

3. The device herein described for connecting a cyclometer with a bicycle, consisting of an oblong main plate 8, and a corresponding supplemental plate 15, said plates being provided with openings, and a key-bolt 24 which is adapted to be passed through said openings, said supplemental plate being provided with an angular extension 18, upwardly-directed jaws 19, having angular extension 22, and the cyclometer being provided with corresponding jaws 29, said jaws being connected by a bolt 20, substantially as shown and described.

In testimony that I claim the foregoing as my invention I have signed my name, in presence of the subscribing witnesses, this 1st day of April, 1897.

FREDERICK MACKINTOSH.

Witnesses:
HOWARD R. SARGENT,
JOHN L. HALL.